United States Patent [19]

Papillon

[11] Patent Number: 4,667,129
[45] Date of Patent: May 19, 1987

[54] METHOD AND DEVICE FOR AUTOMATICALLY SWITCHING ON AND OFF THE HEADLIGHTS OF A MOTOR VEHICLE

[76] Inventor: Jacques Papillon, 2505 Ardennes, #101, Brossard, Canada, J4Z 3P4

[21] Appl. No.: 853,966

[22] Filed: Apr. 21, 1986

[51] Int. Cl.$^4$ ............................................. B60Q 1/02
[52] U.S. Cl. ................................ 315/82; 307/10 LS; 315/77; 340/641; 340/79
[58] Field of Search ............... 315/77, 82; 307/10 LS; 340/251

[56] References Cited

U.S. PATENT DOCUMENTS

| | | | |
|---|---|---|---|
| 2,648,801 | 8/1953 | Hall | 315/83 |
| 3,262,011 | 7/1966 | Cones | 315/82 |
| 3,341,736 | 9/1967 | Fortney | 315/82 |
| 3,369,147 | 2/1968 | Ramsey | 315/83 |
| 3,402,321 | 9/1968 | Tagawa | 315/83 |
| 3,474,296 | 10/1969 | Rickey | 315/77 |
| 3,702,415 | 11/1972 | Schultz | 315/82 |
| 3,706,006 | 12/1972 | Miller | 315/83 |
| 3,774,071 | 11/1973 | Goodrich | 315/82 |
| 3,832,597 | 8/1974 | Mitchell | 315/82 |
| 3,876,904 | 4/1975 | Weber | 315/93 |
| 4,337,400 | 6/1982 | Hahn | 307/10 LS |

FOREIGN PATENT DOCUMENTS

| | | |
|---|---|---|
| 520699 | 1/1956 | Canada . |
| 790158 | 7/1968 | Canada . |
| 790719 | 7/1968 | Canada . |
| 805267 | 1/1969 | Canada . |
| 806286 | 2/1969 | Canada . |

*Primary Examiner*—Harold Dixon
*Attorney, Agent, or Firm*—Robic, Robic & Associates

[57] ABSTRACT

In a motor vehicle comprising headlights, an ignition switch, and an electric energy storage battery, there is provided a device for automatically turning on and off the headlights. A first and a second comparators responsive to two different reference voltages and to the voltage V present between the terminals of the battery determine whether the voltage V has an amplitude located within a predetermined range of voltage amplitudes. An electronic switch interposed between the battery and the headlights is controlled by the outputs of the first and second comparators to turn the headlights on when the amplitude of the voltage V is located within the predetermined range, and to turn the headlights off when the voltage V is outside of this range. The device is connected to the battery so that it operates only when the ignition switch is closed. The device is also connected in parallel with the normal, manually operated lighting switch so as to allow normal operation of the headlights through the latter switch.

20 Claims, 3 Drawing Figures

METHOD AND DEVICE FOR AUTOMATICALLY SWITCHING ON AND OFF THE HEADLIGHTS OF A MOTOR VEHICLE

BACKGROUND OF THE INVENTION

1. Field of the Invention

The present invention relates to a method and a device for automatically turning on and off the headlights of a motor vehicle. The turning on and off of the headlights is carried out taking into consideration the amplitude of the direct-current voltage present between the positive and negative terminals of the electric energy storage battery of the vehicle, which direct-current voltage being applied to the headlights when turned on.

2. Brief Description of the Prior Art

The statistics indicate that the number of major accidents on the roads would be substantially reduced if the motor vehicles would be always drived with their headlights turned on. This would improve the safety on the roads even during sunny days, but especially during nightfall. It would thus be convenient to install on the motor vehicles a system for automatically turning their headlights on and off, whereby such vehicles would be always drived with the headlights on.

A plurality of systems for automatically turning on and off the headlights of a motor vehicle have already been proposed.

As a first example, U.S. Pat. No. 3,262,011 (CONES) issued on July 19, 1966, describes a lighting system comprising a resistor which interconnects the ignition switch of the motor vehicle with the low beam filaments of two headlights. When the manually operated switch normally used to turn the headlights on and off is open, the low beam filaments are supplied through the ignition switch if the latter is closed. The resistor then causes a diminished illumination of the two headlights. Such a system is suitable for both day and night driving.

As a second example, U.S. Pat. No. 3,402,321 (TAGAWA) issued on Sept. 17, 1968, defines a system for switching electric power between the head and parking lights of a motor vehicle. When the vehicle is stationary and the gas pedal released, the parking lights are on while the headlights are off. When the gas pedal is depressed to cause motion of the vehicle, the headlights are turned on and the parking lights turned off through the action of a relay whose coil is energized in response to depression of the gas pedal. A pulse emitter mechanically coupled to the driving shaft of the vehicle delivers a train of pulses having a frequency proportional to the shaft rotational speed. The pulses are supplied to the coil of a relay to keep the headlights on after the gas pedal has been released, and that as long as the driving shaft rotation exceeds a predetermined magnitude.

U.S. Pat. No. 3,702,415 (SCHULTZ) issued on Nov. 7, 1972, proposes a system associated with the light and ignition switches of an automotive vehicle to turn on the vehicle's headlights along with or instead of its parking lights when the manually operated light switch is in its parking light activating position and the vehicle is in an operating condition.

As a fourth example, U.S. Pat. No. 3,706,006 (MILLER, SR) issued on Dec. 12, 1972, discloses a lighting control system for motor vehicles which turns on the lights of the vehicle whenever the vehicle is operated either by day or night for safety purposes. Such a system includes a pressure switch responsive to operation of the vehicle engine to energize through relays the lights of the vehicle regardless of the position of the normal, manually operated lighting switch. The lights are turned off a predetermined time period after the vehicle has been stopped. Switches are also provided to disconnect the lighting control system so that the lights of the vehicle may be turned on and off in a conventional manner.

U.S. Pat. No. 3,774,071 (GOODRICH) issued on Nov. 20, 1973, proposes a conrtrol system for automatically turning on the headlights of a motor vehicle as soon as the engine is turned on, and the oil pressure reaches its normal operating level or the transmission is shifted into a drive position. The headlights are turned off when the ignition is switched off and the engine stops.

U.S. Pat. No. 3,832,597 (MITCHELL) issued on Aug. 27, 1974, describes a light energizing system for compelling all the running lights of a motor vehicle to be energized, with the definite exception of the high beam headlights, whenever, day or night, the ignition switch is placed in running position and the transmission is set for forward drive.

As a last example, U.S. Pat. No. 4,337,400 (HAHN) issued on June 29, 1982, discloses an automatic headlight control system for a motor vehicle. When the vehicle ignition is on, turning the windshield wiper switch on causes energization of a switching relay to turn the headlights on, while turning the windshield wiper switch off causes the switching relay to be de-energized to turn the headlights off. Turning the ignition switch off causes both turning off of the headlights and windshield wipers.

As can be seen, none of the above-discussed prior art systems for automatically turning on and off the headlights of a motor vehicle takes into consideration the amplitude of the direct-current voltage present between the positive and negative terminals of the electric energy storage battery of the vehicle.

The amplitude of the direct-current voltage present between the positive and negative terminals of the electric energy storage battery of a motor vehicle (which direct-current voltage being applied to the vehicle's headlights when turned on) may be reduced due, for example, to starting of the engine of the vehicle, to the use of booster cables to supply electric energy from the battery to another vehicle for the purpose of starting the engine of the latter, and to very low temperatures. On the other hand, the amplitude of the direct-current voltage may be increased, for example, during charging of the battery by the alternator of the vehicle after a long engine starting operation, during power boosting of the battery by the electric energy storage battery of another motor vehicle, and during malfunctioning or testing of the alternator.

As the amplitude of the direct-current voltage appearing between the positive and negative terminals of the electric energy storage battery of a motor vehicle may vary as discussed hereinabove, a system for automatically turning on and off the headlights of a vehicle may be advantageously designed to turn the headlights on only when the amplitude of the direct-current voltage is located within a predetermined range of voltage amplitudes, i.e. when the direct-current voltage is higher than a first predetermined voltage amplitude in order to protect the battery, and when the battery direct-current voltage is lower than a second predetermined voltage amplitude higher than the first one to protect the headlights. Under these conditions, the headlights are not supplied with electric power when the direct-current voltage is too low (in order to protect the battery), and the headlights cannot be subjected to a too high direct-current voltage, so as to protect the same.

SUMMARY OF THE INVENTION

An object of the present invention is therefore to provide a method and a device for automatically turning on and off the headlights of a motor vehicle, which take into consideration the amplitude of the direct-current voltage between the positive and negative terminals of the vehicle's battery, for the purpose of protecting both battery and the headlights.

More specifically, the present invention proposes a method for automatically turning on and off the headlights of a motor vehicle provided with electric energy supplying means which delivers an electrical voltage. Such a method comprises the steps of:

determining whether the voltage delivered from the supplying means has an amplitude located within a predetermined range of voltage amplitudes;

turning the headlights on by connecting the supplying means with the headlights so that the supplying means supplies electric energy to the headlights when the amplitude of the voltage delivered from the supplying means is located within the predetermined range of voltage amplitude; and turning the headlights off by disconnecting the supplying means from the headlights when the amplitude of the voltage delivered from the supplying means is located outside of the predetermined range of voltage amplitudes.

Also in accordance with the present invention, there is provided, in a motor vehicle comprising headlights and electric energy supplying means which delivers an electrical voltage, a device for automatically turning on and off the headlights of the vehicle. Such a device comprises means responsive to the voltage delivered from the supplying means for determining whether this voltage has an amplitude located within a predetermined range of voltage amplitudes. Switching means controlled by the determined means and interposed between the supplying means and the headlights (a) interconnects the supplying means with the headlights so that the supplying means supplies electric energy to the headlights to turn them on when the amplitude of the voltage delivered from the supplying means is located within the predetermined range of voltage amplitudes, and (b) disconnects the supplying means from the headlights to turn them off when the amplitude of the voltage delivered from the supplying means is located outside of the predetermined range of voltage amplitudes.

BRIEF DESCRIPTION OF THE DRAWINGS

The objects, advantages and other features of the present invention will become more apparent upon reading of the following non-restrictive description of a preferred embodiments thereof, given for the purpose of examplification only with reference to the accompanying drawings in which.

DETAILED DESCRIPTION OF THE PREFERRED EMBODIMENT

Figure 1:
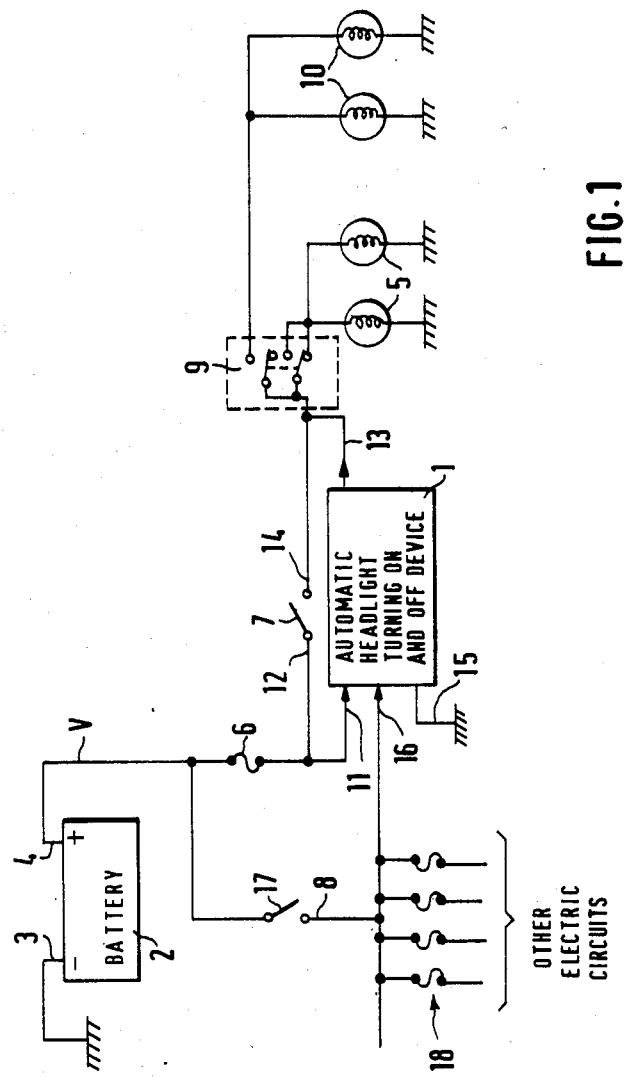
FIG. 1 is a diagram showing the interconnections of a device for automatically turning on and off the headlights of a motor vehicle according to the present invention with the electric lighting system of the vehicle.

As illustrated on FIG. 1, the motor vehicle, for example a car, comprises an electric energy storage battery 2 provided with a negative terminal 3 connected to the ground (the metal body of the vehicle), and with a positive terminal 4 which supplies the headlights of the vehicle through a fuse 6, the normal, manually operated lighting switch 7, and a dimer switch 9.

A plurality of other electric circuits of the vehicle are also supplied through the terminal 4 of the battery, an ignition switch 17 of the vehicle and a plurality of fuses 18.

It is well known that a motor vehicle, such as a car, may be provided with a two-headlight system or a four-headlight system.

A four-headlight system comprises, as illustrated on FIG. 1, two low-beam headlights 5, and two high-beam headlights 10. The dimmer switch 9 allows selective turning on of the low-beam headlights 5 or of both the low and high-beam headlights 5 and 10. An application of the device 1, of the invention to a four-headlight system will be described hereinafter.

In the case of a two-headlight system, each headlight comprises a low-beam filament and a high-beam filament. The switch 9 then allows selective energization of the low beam filaments of of both the low and high-beam filaments of the two headlights. Such a two-headlight system is not illustrated in the drawings. It will appear to those skilled in the art that the device 1 of the invention can also be used in combination with a two-headlight system.

The device 1 according to the present invention is connected in parallel with the lighting switch 7 so that normal use of the headlights of the vehicle through the switches 7 and 9 is still possible, as it will become more apparent upon reading of the following description. More particularly, an input 11 of the device 1 is connected to a first terminal 12 of the switch 7, while an output 13 of the device 1 is connected with the second terminal 14 of the switch 7. The device 1 is also grounded at 15.

A second input 16 of the device 1 is connected to a terminal 8 of the ignition switch 17 of the motor vehicle. When the switch 17 is closed, the input 16 is connected to the positive terminal 4 of the battery 2.

Figure 2:
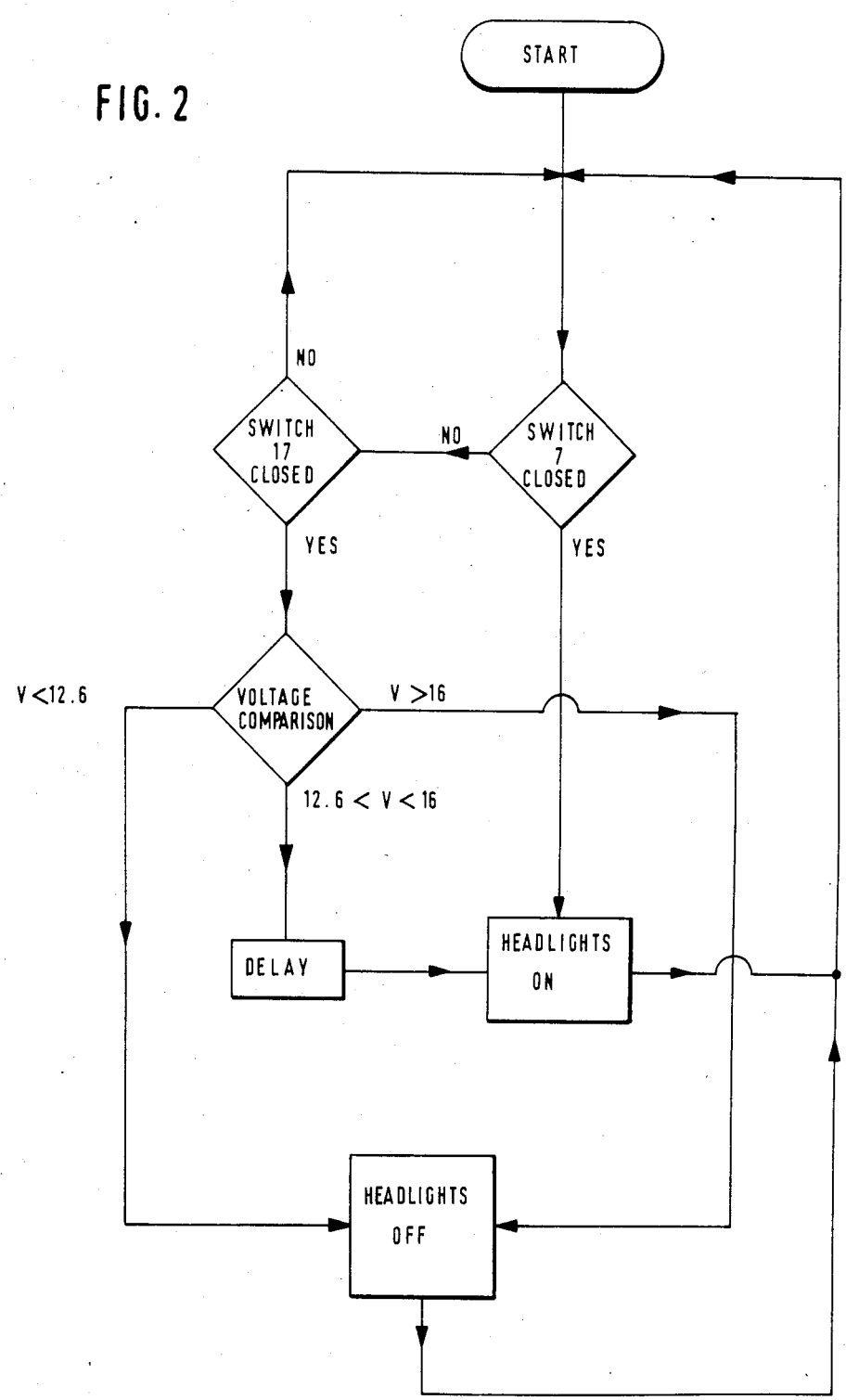
FIG. 2 is an algorithm showing the operation of the electric lighting system of FIG. 1 including a device according to the present invention.

FIG. 2 is an algorithm showing the operation of the vehicle's lighting system including the device 1 according to the invention.

When the switches 7 and 17 of FIG. 1 are both open, the headlights of the vehicle are off (no energization of the headlights is possible).

When the lighting switch 7 is closed, the headlights 5 or 5 and 10 (depending on the position of the dimmer switch 9) are turned on. This corresponds to the normal operation of the headlights of the vehicle through the manually operated lighting switch 7. Such normal operation is still possible when the ignition switch 17 is closed, i.e. when the device 1 is energized, due to the parallel connection of the switch 7 and of this device 1.

If the lighting switch 7 is open, and the ignition switch 17 is closed, the voltage V present between the terminals 3 and 4 of the battery 2 and applied to the input 16 of the device 1 through the ignition switch 17 is compared with two reference voltages (12.6 volts and 16 volts). When the voltage V has a value higher than 16 volts or lower than 12.6 volts, the headlights are turned off. On the contrary, when the voltage V between the terminals 3 and 4 of the battery 2 has a value located between 12.6 and 16 volts, the headlights (5 or 5 and 10 depending on the position of the switch 9) are turned on. Each turning on of the headlights is delayed of a predetermined period of time, to prevent untimely turning on.

Therefore the headlights of the vehicle are not turned on by the device 1 when the voltage V between the terminals of the battery 2 has an amplitude lower than 12.6 volts. This voltage V may become lower than 12.6 volts during starting of the engine of the vehicle, during use of booster cables to supply electric energy from the battery 2 to another vehicle for the purpose of starting the engine of the latter, and during very low temperatures. The battery 2 is thus protected as it does not supply, during such conditions, electric energy to the headlights, thereby reducing the amount of electric energy supplied by the battery 2.

In the same manner, the device 1 does not turn the headlights on when the voltage V has an amplitude higher than 16 volts, thus protecting the headlights against failure, due to too high voltage and current applied thereto. The latter protection is useful, for example, when the alternator produces an excess of voltage and current during some seconds following starting of the alternator after a long engine starting operation which has considerably reduced the charge of the battery 2, when booster cables are used to supply electric energy from the battery of another vehicle to the battery 2 for the purpose of starting the engine, when the alternator is faulty and operates in constant output demand, or when the constant output demand of the alternator is checked by a mechanician.

As an example, after starting of the engine, the alternator of the vehicle produces a voltage and current which charge the battery 2 with electric energy, the voltage V then having an amplitude lower than 12.6 volts for any of the reasons discussed hereinabove. As soon as the amplitude of the voltage V becomes higher than 12.6 volts, the device 1 turns the headlights 5 or 5 and 10 on, depending on the position of the dimmer switch 9, and that after the above mentioned predetermined time delay. The headlights are turned on as long as the voltage V has an amplitude located between 12.6 and 16volts. Thereafter, if the amplitude of the voltage V between the terminals 3 and 4 of the battery 2 becomes lower than 12.6 volts or higher than 16 volts, the device 1 turns the headlights off.

Figure 3:
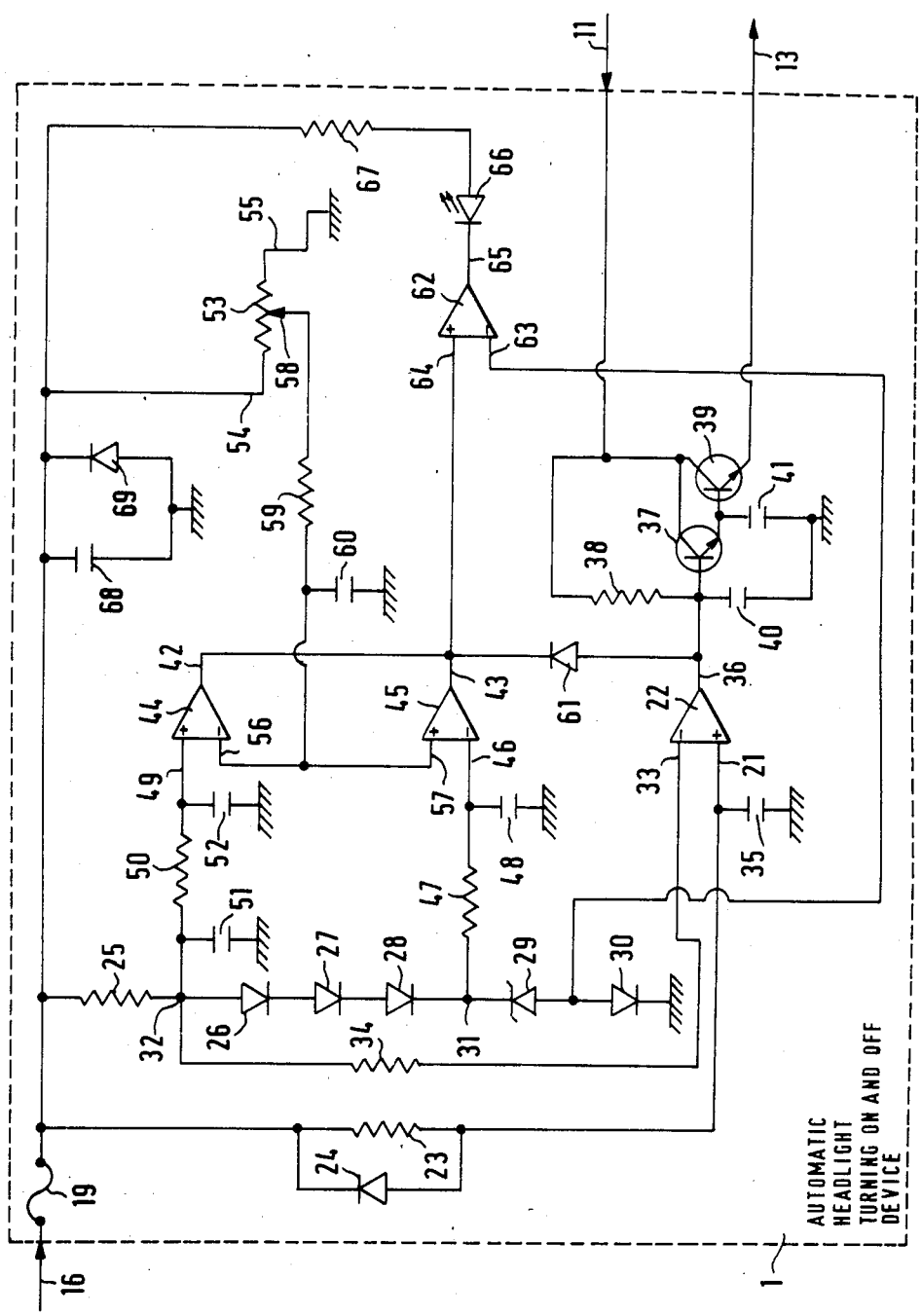
FIG. 3 illustrates the electronic circuit of the device for automatically turning on and off the headlights of a motor vehicle shown in FIG. 1.

FIG. 3 illustrates in detail the circuit of the device 1 according to the present invention.

The voltage V present on the input 16 of the device 1 when the ignition switch 17 is closed is supplied to this device 1 through a fuse 19.

The voltage V on the input 16 establishes a current through a resistor 25, diodes 26, 27 and 28, a Zener diode 29 and another diode 30, whereby a first reference voltage is produced at point 31 while a second reference voltage is produced at point 32. The first reference voltage at point 31 corresponds to the avalanche-breakdown reverse voltage of the Zener diode 29 to which is added the anode-cathode junction voltage of the diode 30. On the other hand, the second reference voltage at point 32 corresponds to the reference voltage at point 31 to which is added the anode-cathode junction voltages of the diodes 26, 27 and 28.

The voltage V on the input 16 is also applied to the non-inverting input 21 of a comparator 22 through a resistor 23 connected in parallel with a diode 24, while the second reference voltage is applied to the inverting input 33 of the comparator 22 through a resistor 34. Of course, the diodes 26 to 28 and 30 as well as the Zener diode 29 are selected to produce first and second reference voltages at points 31 and 32 which are lower than the normal operating voltage V of the battery 2. A high logic level signal is therefore delivered on the output 36 of the comparator 22 as long as the amplitude of the operating voltage V of the battery 2 is higher than that of the second reference voltage established by the Zener diode 29 and the diodes 26, 27, 28 and 30, while a low logic level signal is produced on the output 36 when the amplitude of the voltage V is reduced to such an extent that it cannot produce the second reference voltage.

The output 36 of the comparator 22 is connected to the base of a first transistor 37 to control conduction of the latter. The base of the transistor 37 is also connected to the input 11 (see FIG. 1) of the device 1 through a resistor 38 and to the ground through a capacitor 40. The emitter of the transistor 37 is connected to the base of a second transistor 39 and to the ground through a capacitor 41. The collectors of both the transistors 37 and 39 are connected to the input 11 (see FIG. 1) of the device 1. The transistors 37 and 39 are consequently mounted according to a Darlington circuit.

As can be seen, a high logic level signal on the output 36 of the comparator 22 causes conduction of the transistors 37 and 39 to turn the headlights on through the output 13, while a low logic level signal on the output 36 causes no conduction of the two transistors 37 and 39 to turn the headlights off.

Consequently, when the voltage V on the input 16 has an amplitude which is too low to establish the second reference voltage at point 32, which may cause unappropriate operation of the device 1, the comparator 22 produces on its output 36 a low logic level signal, thereby keeping the transistors 37 and 39 switched off to prevent undesired energization of the headlights when the voltage V is too low.

On the contrary, when the voltage V on the input 16 has an amplitude higher than that of the second reference voltage at point 32, the comparator delivers on its output 36 a high logic level signal to allow normal operation of the device 1 as will be seen in more details hereinafter.

A capacitor 35, connected between the non-inverting input 21 of the comparator 22 and the ground, delays production of a high logic level signal on the output 36. More particularly, the voltage V is applied to the non-inverting input 21 of the comparator 22 only after a time delay following closing of the switch 17 which time delay is determined by the time constant of the resistor 23, and of the capacitor 35. The diode 24 facilitates discharge of the capacitor 35, for example after opening of the switch 17.

The capacitor 40, connected between the output 36 of the comparator 22 and the ground, also delays switching on of the transistors 37 and 39 in response to a high logic level signal appearing on this output 36. Indeed, the high logic level signal appears on the output 36 only after the capacitor 40 is charged.

As long as a high logic level signal is present on the output 36, the transistors 37 and 39 are conducting, whereby the headlights 5 or 5 and 10, depending on the position of the dimer switch 9, are energized through these two transistors and the output 13 (see FIG. 1) of the device 1. Of course, the transistors 37 and 39 are selected to support the current demand of the headlights of the vehicle.

The first reference voltage at point 31 is applied to the inverting input 46 of a comparator 45 through a resistor 47. A filtering capacitor 48 is connected between this inverting input 46 and the ground.

The second reference voltage at point 32 is applied to the non-inverting input 49 of a comparator 44 through a resistor 50. Filtering capacitors 51 and 52 are respectively connected between the point 32 and the ground, and between the non-inverting input 49 and the ground.

A potentiometer 53 has its first fixed contact 54 connected to the input 16 of the device 1 through the fuse 19 and its second fixed contact 55 connected to the ground. The inverting input 56 of the comparator 44 and the non-inverting input 57 of the comparator 45 are interconnected together and are both connected to the movable contact 58 of the potentiometer 53 through a resistor 59. A filtering capacitor 60 is connected between the interconnected inputs 56 and 57 and the ground.

The first reference voltage at point 31 and the second reference voltage at point 32 are so selected and the voltage V is so reduced by the potentiometer 53 that the comparator 45 generates on its output 43 a low logic level signal when the voltage V has an amplitude lower than 12.6 volts, the comparator 44 produces on its output 42 a low logic level signal when the voltage V has an amplitude higher than 16 volts, and the comparators 44 and 45 both produce on their respective outputs 42 and 43 high logic level signals as long as the voltage V has an amplitude located between 12.6 and 16 volts.

As shown in FIG. 3, the outputs 42 and 43 of the comparators 44 and 45 are interconnected together, while the output 36 of the comparator 22 is connected to the interconnected outputs 42 and 43 through a diode 61.

When the amplitudes of the signals applied to the inputs 21 and 23 of the comparator 22 are such that a high logic level signal is produced on the output 36 of this comparator, the transistors 37 and 39 are switched on to supply the headlights 5 or 5 and 10, depending on the position of the dimer switch 9, and that as long as the outputs 42 and 43 also deliver high logic level signals, i.e. as long as the voltage V has an amplitude located between 12.6 and 16 volts. When the amplitude of the voltage V passes outside of the latter range, one of the comparators 44 and 45 produces on its output a low logic level signal which is applied to the cathode of the diode 61. This diode 61 then reduces the amplitude of the signal on the output 36 of the comparator 22 to a low logic level to switch off the transistors 37 and 39 and to turn the headlights off.

Subsequently, when the amplitude of the voltage V comes back within the range defined between 12.6 and 16 volts, a high logic level signal is produced on both the outputs 42 and 43. A high logic level signal is then applied to the cathode of the diode 61. The capacitor 40, which has been discharged during application to the low logic level signal to the cathode of the diode 61, is then charged through the output 36 of the comparator 22 and through the input 11 and the resistor 38. When the capacitor 40 has been charged so that a high logic level signal appears on the output 36, the transistors 37 and 39 are switched on to thereby turn the headlights 5 or 5 and 10 on. The capacitor 40 delays the turning on of the headlights after application of a high logic level signal to the cathode of the diode 61.

A fourth comparator 62, having its inverting input 63 connected to the ground through the diode 30 and its non-inverting input 64 to both the comparator output 42 and 43, produced on its output 65 a high logic level signal as long as both the outputs 42 and 43 delivers high logic level signals, in order to keep de-energized a light emitting diode 66. The comparator 62 also produces a low logic level signal on its output 65 when one of the comparator outputs 42 and 43 delivers a low logic level signal, so as to cause energization of the light emitting diode 66 through a resistor 67, the fuse 19 and the input 16 of the device 1. Lighting of the diode 66 therefore indicates turning off of the headlights of the motor vehicle. It is particularly useful during day time to check whether the headlights are turned on or turned off.

A filtering capacitor 60 connected in parallel with a diode 69 stabilizes the voltage which supplies the circuit of the device 1.

It should be pointed out that the device 1 operates as described hereinabove when the switch 7 is open. Indeed, when the switch 7 is closed, the headlights of the vehicle can be operated in the same manner as when no device 1 is provided. The connections of the device 1 to the electric circuit of the vehicle and the design of this device 1 are selected for this purpose.

It can be appreciated from FIG. 1 that the device 1 can be easily installed on any motor vehicle, including cars, trucks, motorcycles, and so on, even during construction of the same, by connecting the input 11 to the terminal 12 of the switch 7, the output 13 to the terminal 14 of the switch 7, the input 16 to the terminal 8 of the ignition switch 17, and by grounding the output 15 of the device 1.

Although the present invention has been described hereinabove by way of a preferred embodiment thereof, it should be pointed out that such preferred embodiment may be modified at will, within the scope of the appended claims, without changing or altering the scope and nature of the present invention.

I claim:

1. In a motor vehicle comprising headlights and electric energy supplying means which delivers an electrical voltage, a device for automatically turning on and off the headlights of the vehicle, commmprising:

means responsive to the voltage delivered from the supplying means for determining whether said voltage has an amplitude located within a predetermined range of voltage amplitudes; and switching means controlled by said determining means and interposed between the supplying means and the headlights for (a) interconnecting the supplying means with the headlights so that the supplying means supplies electric energy to the headlights to turn them on when the amplitude of said voltage is located within the predertermined range of voltage amplitudes, and (b) disconnecting the supplying means from the headlights to turn them off when the amplitude of said voltage is located outside of the predetermined range of voltage amplitudes.

2. A device according to claim 1, wherein the switching means comprises means for preventing turning on of the headlights when the amplitude of the voltage from the supplying means is lower than a predetermined reference value.

3. A device according to claim 1, wherein said determining means comprises:
   a first comparator including a non-inverting input to which is applied a first reference voltage, and an inverting input to which is applied the voltage delivered from the supplying means; and
   a second comparator including an inverting input to which is applied a second reference voltage, and a non-inverting input to which is applied the voltage delivered from the supplying means.

4. A device according to claim 3, in which the voltage delivered from the supplying means is applied to the inverting input of the first comparator through a voltage divider.

5. A device according to claim 3, in which the voltage delivered from the supplying means is applied to the non-inverting input of the second comparator through a voltage divider.

6. A device according to claim 3, wherein said determining means comprises a plurality of diodes connected in series to produce said first and second reference voltages, said plurality of diodes including at least one Zener diode.

7. A device according to claim 3, wherein the switching means comprises a third comparator having a non-inverting input to which is applied the voltage delivered from the supplying means, an inverting input to which is applied said first reference voltage, and an output connected to said switching means.

8. A device according to claim 7, wherein said first and second comparators each comprise an output, the outputs of said first and second comparators being interconnected together, said device further comprising a diode having an anode connected to the output of the third comparator and a cathode connected to the interconnected outputs of the first and second comparators.

9. A device according to claim 7, wherein said switching means comprises a first transistor and a second transistor each having a base, an emitter and a collector, the base of the first transistor being connected to the output of the third comparator, the base of the second transistor being connected to the emitter of the first transistor, the collectors of the first and second transistors being interconnected together, which interconnected collectors being connected to the supplying means, and the headlights of the vehicle being connected between the emitter of the second transistor and the ground.

10. A device according to claim 9, in which the switching means comprises a capacitor connected between the base of the first transistor and the ground to delay turning on of the headlights of the vehicle.

11. A device according to claim 3, wherein the first and second comparators each comprise an output, the outputs of the first and second comparators being interconnected together, said device further comprising a third comparator having a non-inverting input connected to the interconnected outputs of the first and second comparators, and a grounded inverting input, said third comparator also comprising an output which causes energization of a light emitting diode when the interconnected outputs of the first and second comparators supplies a signal having an amplitude indicating that the amplitude of the voltage from the supplying means is located outside of said predetermined range of voltage amplitudes, energization of the light emitting diode causing lighting of the latter to indicate turning off of the headlights.

12. A device according to claim 1, in which said supplying means comprises an electric energy storage battery.

13. A device according to claim 12, in which the motor vehicle comprises an ignition switch, and wherein said device is supplied with electric energy from the battery through the ignition switch, whereby operation of said device is enabled only when said ignition switch is closed.

14. A device according to claim 1, wherein said switching means comprises means for delaying turning on of the headlights.

15. A device according to claim 1, wherein the motor vehicle comprises an ignition switch, the voltage delivered from the supplying means being applied to the determining means through said ignition switch.

16. A device according to claim 1, wherein said motor vehicle comprises a manually operated switch to turn on and off the headlights, said device being connected in parallel with said manually operated switch so that the headlights can still be operated through said manually operated switch.

17. A method for automatically turning on and off the headlights of a motor vehicle provided with electric energy supplying means which delivers an electrical voltage, said method comprising the steps of:
   determining whether the voltage delivered from the supplying means has an amplitude located within a predetermined range of voltage amplitudes;
   turning the headlights on by connecting the supplying means with the headlights so that the supplying means supplies electric energy to the headlights when the amplitude of the voltage delivered from the supplying means is located within the predetermined range of voltage amplitudes; and
   turning the headlights off by disconnecting the supplying means from the headlights when the amplitude of said voltage is located outside of the predetermined range of voltage amplitudes.

18. The method of claim 17, further comprising the step of delaying turning on of the headlights.

19. The method of claim 17, wherein the determining step comprises the step of comparing the voltage delivered from the supplying means with first and second reference voltages.

20. The method of claim 17, wherein said supplying means comprises an electric energy storage battery.

* * * * *